(12) United States Patent
Sheridan et al.

(10) Patent No.: US 10,808,753 B1
(45) Date of Patent: Oct. 20, 2020

(54) METHOD AND APPARATUS FOR MOUNTING MULTIPLE BEARINGS ON A SHAFT

(71) Applicant: UNITED TECHNOLOGIES CORPORATION, Farmington, CT (US)

(72) Inventors: William G. Sheridan, Southington, CT (US); Todd A. Davis, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/429,151

(22) Filed: Jun. 3, 2019

(51) Int. Cl.
| F16C 19/38 | (2006.01) |
| F16C 19/49 | (2006.01) |
| F16C 19/54 | (2006.01) |
| F16C 27/04 | (2006.01) |
| F01D 25/16 | (2006.01) |
| F16F 9/50 | (2006.01) |

(52) U.S. Cl.
CPC ............ *F16C 19/54* (2013.01); *F01D 25/162* (2013.01); *F01D 25/164* (2013.01); *F16C 19/38* (2013.01); *F16C 19/49* (2013.01); *F16C 27/045* (2013.01); *F16F 9/50* (2013.01); *F16C 2360/23* (2013.01)

(58) Field of Classification Search
CPC .......... F16C 19/38; F16C 19/49; F16C 19/54; F16C 27/045; F16C 2360/23; F01D 25/162; F01D 25/164; F16F 9/50
USPC ................ 384/447, 534, 548, 543, 564, 494
See application file for complete search history.

(56) References Cited

U.S. PATENT DOCUMENTS

| 3,756,672 A * | 9/1973 | Hibner ................. F01D 25/164 384/99 |
| 3,915,521 A * | 10/1975 | Young ................... F16C 33/586 384/467 |
| 4,035,044 A * | 7/1977 | Miyazaki ................ F16C 23/10 384/447 |
| 4,337,983 A | 7/1982 | Hibner |
| 4,421,187 A * | 12/1983 | Shibata ................. B60K 17/24 180/297 |
| 4,457,667 A * | 7/1984 | Seibert ................. F01D 25/164 384/582 |

(Continued)

FOREIGN PATENT DOCUMENTS

| GB | 1003740 A * | 9/1965 | ............. F02K 3/072 |
| GB | 1284602 A * | 8/1972 | ........... F01D 25/164 |

OTHER PUBLICATIONS

Fehrm, Bjorn. "Bjorn's Corner: Turbofan Engine Challenges, Part 4." Nov. 18, 2016.

*Primary Examiner* — Marcus Charles
(74) *Attorney, Agent, or Firm* — Carlson, Gaskey & Olds, P.C.

(57) ABSTRACT

A method and an apparatus includes a static engine structure, at least one shaft that rotates relative to the static engine structure, and a bearing assembly that supports the shaft. The bearing assembly includes at least one first bearing hard mounted directly between the shaft and the static engine structure and at least one second bearing mounted between the shaft and the static engine structure. The at least one second bearing includes a damper. Also included is at least one third bearing that is mounted between the shaft and the static engine structure, wherein the at least one third bearing includes a resilient member.

22 Claims, 4 Drawing Sheets

(56) References Cited

U.S. PATENT DOCUMENTS

| | | | | |
|---|---|---|---|---|
| 4,668,105 | A | 5/1987 | Furukawa et al. | |
| 4,947,639 | A * | 8/1990 | Hibner | F01D 25/164 |
| | | | | 384/535 |
| 5,110,257 | A | 5/1992 | Hibner et al. | |
| 5,117,704 | A * | 6/1992 | Kish | B64C 27/12 |
| | | | | 464/75 |
| 5,228,784 | A * | 7/1993 | Bobo | F16C 27/045 |
| | | | | 384/487 |
| 7,574,854 | B2 | 8/2009 | Moniz | |
| 7,931,436 | B2 * | 4/2011 | Dobek, Jr. | F16C 33/366 |
| | | | | 415/104 |
| 8,220,145 | B2 | 7/2012 | Hiner et al. | |
| 8,220,245 | B1 | 7/2012 | Papandreas | |
| 8,267,592 | B2 | 9/2012 | Godleski | |
| 8,668,457 | B2 * | 3/2014 | Juh | F01D 5/027 |
| | | | | 416/145 |
| 8,727,699 | B2 | 5/2014 | Vetters et al. | |
| 9,933,012 | B1 | 4/2018 | Grillo et al. | |
| 10,066,504 | B2 * | 9/2018 | Sheridan | F02C 7/06 |
| 10,156,159 | B1 * | 12/2018 | Ganiger | F01D 25/164 |
| 2014/0020995 | A1 * | 1/2014 | Hopper | F16F 9/14 |
| | | | | 188/297 |
| 2018/0245629 | A1 * | 8/2018 | Takaoka | F16C 33/581 |
| 2019/0063261 | A1 | 2/2019 | Varney et al. | |
| 2020/0018350 | A1 * | 1/2020 | Weiner | F02C 7/06 |

* cited by examiner

METHOD AND APPARATUS FOR MOUNTING MULTIPLE BEARINGS ON A SHAFT

BACKGROUND

This application relates to a gas turbine engine that includes a method and apparatus for mounting multiple bearings on a shaft to maintain desired alignment.

Gas turbine engines are used to drive geared turbofan engines, helicopter rotors, and fixed wing propellers, for example. These engines have one or more shafts/spools that are used to support and drive rotating components. Multiple bearings are mounted on a shaft to keep the shaft aligned and within a desired operational speed range. Due to tolerance variations, it is difficult to assemble multiple bearings on the shaft and maintain the desired alignment.

SUMMARY

In a featured embodiment, an apparatus includes a static engine structure, at least one shaft that rotates relative to the static engine structure, and a bearing assembly that supports the shaft. The bearing assembly includes at least one first bearing hard mounted directly between the shaft and the static engine structure, at least one second bearing mounted between the shaft and the static engine structure, wherein the at least one second bearing includes a damper, and at least one third bearing mounted between the shaft and the static engine structure, wherein the at least one third bearing includes a resilient member.

In another embodiment according to the previous embodiment, the at least one first bearing is a ball bearing.

In another embodiment according to any of the previous embodiments, the at least one second and third bearings are each a roller bearing.

In another embodiment according to any of the previous embodiments, the damper of the at least one second bearing comprises a viscous damper.

In another embodiment according to any of the previous embodiments, the resilient member of the at least one third bearing comprises at least one spring element in combination with a viscous damper.

In another embodiment according to any of the previous embodiments, the bearing assembly further includes at least one fourth bearing that is hard mounted directly between the shaft and the static engine structure, and wherein the at least one second bearing is downstream of the at least one first bearing, the at least one third bearing is downstream of the at least one second bearing, and the at least one fourth bearing is downstream of the at least one third bearing.

In another embodiment according to any of the previous embodiments, the shaft is coupled to a turbine configured to drive a rotating engine component.

In another embodiment according to any of the previous embodiments, the static engine structure includes at least an inlet case portion, an inner turbine case portion, and a turbine exhaust case portion, and wherein the at least one first bearing is mounted directly between the shaft and the inlet case portion, the at least second bearing is mounted between the shaft and the inlet case portion, the at least one third bearing is mounted between the shaft and the inner turbine case, and the at least one fourth bearing is mounted between the shaft and the turbine exhaust case portion.

In another embodiment according to any of the previous embodiments, the at least one first bearing comprises a ball bearing and the at least one second, third, and fourth bearings each comprise a roller bearing, and wherein the damper of the at least one second bearing comprises an oil film damper and the resilient member of the at least one third bearing comprises at least one spring element in combination with a viscous damper.

In another embodiment according to any of the previous embodiments, the at least one fourth bearing includes an inner race that has a first centerline and an eccentric outer race that has a second centerline that is radially offset from the first centerline.

In another embodiment according to any of the previous embodiments, the eccentric outer race is selectively adjustable during assembly to ensure that the at least one fourth bearing is properly aligned along the shaft with the at least one first, second, and third bearings.

In another exemplary embodiment, an apparatus includes a static engine structure and at least one shaft that rotates relative to the static engine structure, and at least one turbine that drives at least one engine component through the at least one shaft. A bearing assembly supports the shaft and includes at least one first bearing hard mounted directly between the shaft and the static engine structure, at least one second bearing mounted between the shaft and the static engine structure, wherein the at least one second bearing includes a damper, and at least one third bearing mounted between the shaft and the static engine structure, wherein the at least one third bearing includes a resilient member.

In another embodiment according to any of the previous embodiments, the at least one engine component comprises a helicopter rotor or propeller shaft.

In another embodiment according to any of the previous embodiments, the damper of the at least one second bearing comprises an oil film damper, and wherein the resilient member of the at least one third bearing comprises at least one spring element in combination with a viscous damper.

In another embodiment according to any of the previous embodiments, the bearing assembly further includes at least one fourth bearing that is hard mounted directly between the shaft and the static engine structure, and wherein the at least one second bearing is downstream of the at least one first bearing, the at least one third bearing is downstream of the at least one second bearing, and the at least one fourth bearing is downstream of the at least one third bearing, and wherein the at least one fourth bearing includes an inner race that has a first centerline and an eccentric outer race that has a second centerline that is radially offset from the first centerline.

In another featured embodiment, a method includes providing at least one shaft that is configured to rotate relative to a static engine structure about an axis, mounting a first bearing directly between the shaft and the static engine structure, mounting a second bearing to the shaft, wherein the at least one second bearing includes a viscous film damper, and mounting a third bearing to the shaft, wherein the at least one third bearing includes a resilient member and viscous damper.

In another embodiment according to any of the previous embodiments, the method includes positioning the shaft to extend in a vertical direction during assembly of the first, second, and third bearings.

In another embodiment according to any of the previous embodiments, the method includes mounting a fourth bearing to the shaft subsequent to mounting the first, second, and third bearings, the fourth bearing including an inner race that has a first centerline and an eccentric outer race that has a second centerline that is radially offset from the first centerline.

In another embodiment according to any of the previous embodiments, the method includes measuring an amount of radial offset between the shaft and the static engine structure at a mounting location for the fourth bearing prior to installing the fourth bearing, selecting an eccentric outer race that is configured address the amount of radial offset, rotating the eccentric outer race that has been selected relative to the inner race to properly align with the shaft, and subsequently fixing the eccentric outer race to the static engine structure.

In another embodiment according to any of the previous embodiments, the first bearing is mounted to the shaft prior to the second bearing, the second bearing is mounted to the shaft prior to the third bearing, and the third bearing is mounted to the shaft prior to the fourth bearing.

These and other features may be best understood from the following drawings and specification.

DETAILED DESCRIPTION

Figure 1:
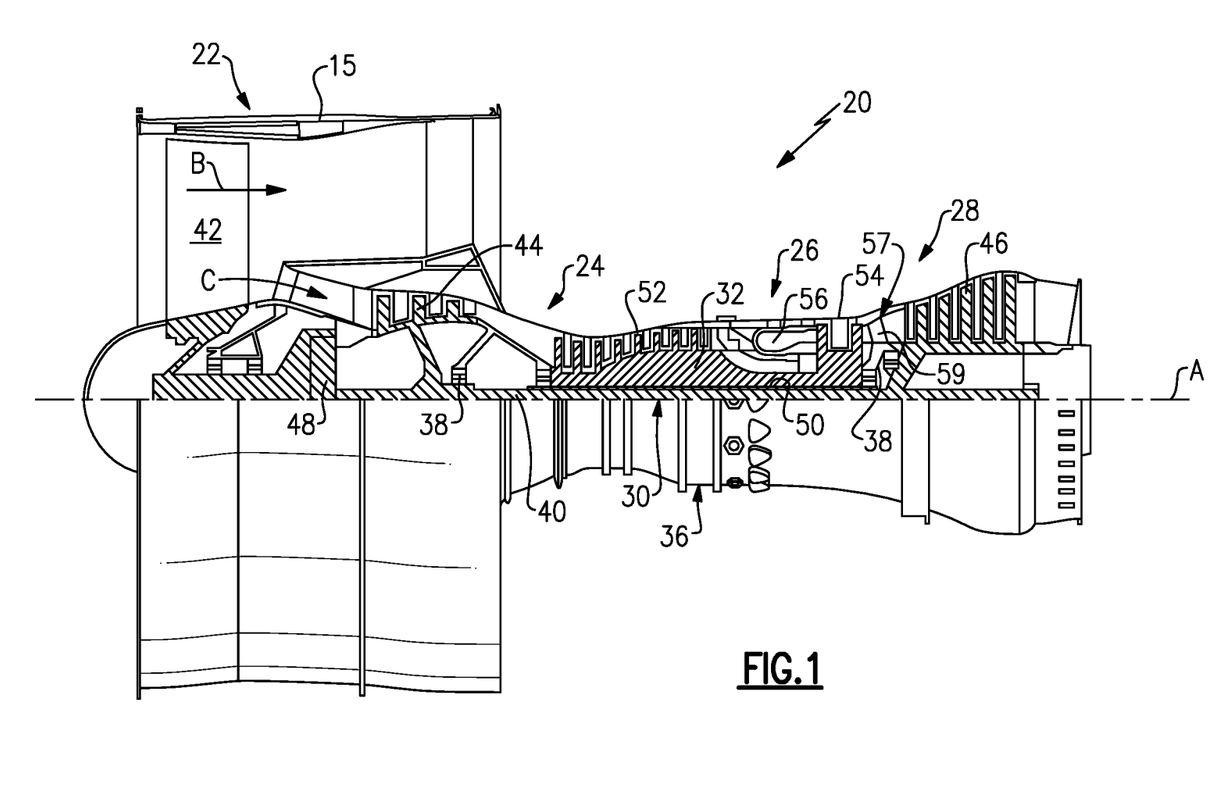
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150 ft/second (350.5 meters/second).

Figure 2:
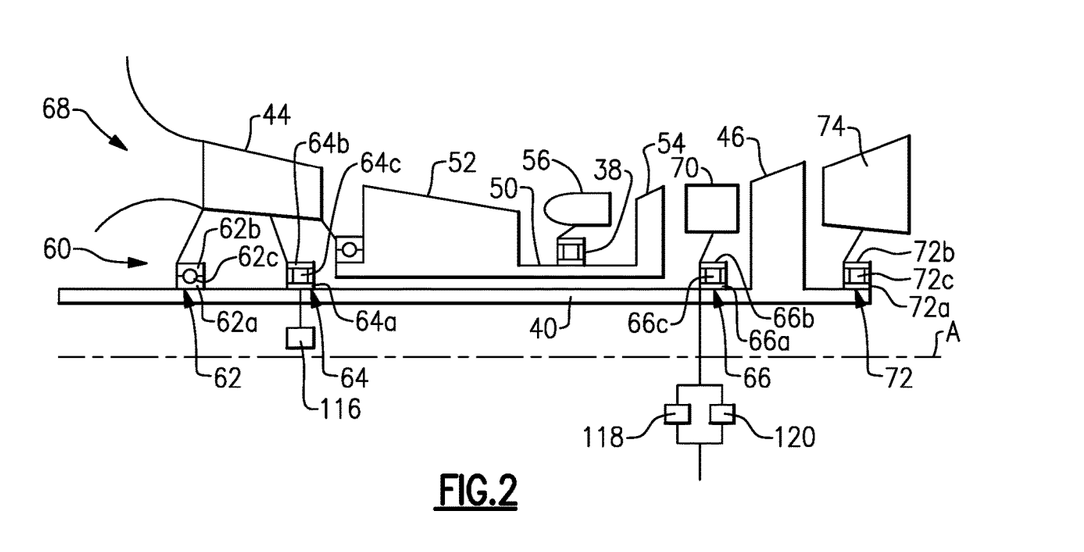
FIG. 2 schematically shows one example of a bearing system layout for a gas turbine engine.

FIG. 2 shows one example of a bearing system 60 for the engine 20. As shown, the outer shaft 50 interconnects the second (or high) pressure compressor 52 and the second (or high) pressure turbine 54, and the combustor 56 is arranged between the high pressure compressor 52 and the high pressure turbine 54. As discussed above, the inner shaft 40 is a power turbine shaft that provides an output to drive a rotating engine component. As shown, the inner shaft 40 interconnects the first (or low) pressure compressor 44 and the first (or low) pressure turbine 46. The shaft 40 is mounted on a set of bearings that transmit load back to static case structures. In the example shown, the bearing system 60 includes at least a first bearing 62, a second bearing 64, and a third bearing 66. The first bearing 62 and the second bearing 64 are located between the shaft 40 and an inlet case 68. The third bearing 66 is located between an inner turbine case 70 and the shaft 40. The bearing system 60 may also include additional bearings, such as a fourth bearing 72 that is located between the shaft 40 and a turbine exhaust case (TEC) 74. Additional bearing systems 38, such as those shown in FIG. 1 and as shown in FIG. 2 between the combustor 56 and outer shaft 50, may also be included as needed.

Figure 3:
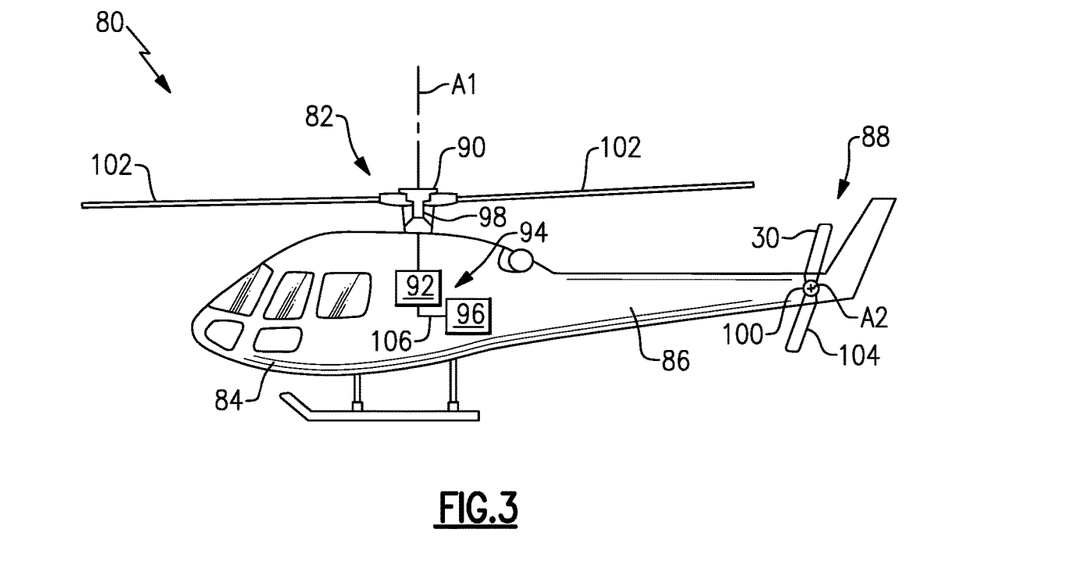
FIG. 3 schematically shows a helicopter with a power turbine that drives a helicopter rotor.

FIG. 3 shows an exemplary aircraft 80 that is a rotary-wing aircraft. The aircraft 80 includes a main rotor assembly 82 supported by an airframe 84. The airframe 84 includes an extending tail 86 which mounts a tail rotor assembly 88. The main rotor assembly 82 includes a main rotor 90 driven about a first axis of rotation A1 through a main rotor gearbox 92 by a power system 94. The power system 94 generates power available for flight operations and includes one or more engines 96 to drive a main rotor hub 98 of the main rotor 90 and a tail rotor 100 of the tail rotor assembly 88. Each engine 96 can comprise a gas turbine engine that includes a combustor and one or more rotatable spools that can each include a turbine driving a compressor and/or an output of the engine as described above.

The main rotor 98 includes a plurality of rotor blades 102 mounted or otherwise secured to the main rotor hub 98. The rotor blades 102 are rotatable about the first axis of rotation A1 to provide propulsion for the aircraft 10. The tail rotor 100 includes a plurality of rotor blades 104 mounted or otherwise secured to a tail rotor hub 32. The rotor blades 30 are rotatable about a second axis of rotation A2 to counteract torque generated by rotation of the rotor blades 102.

Figure 4:
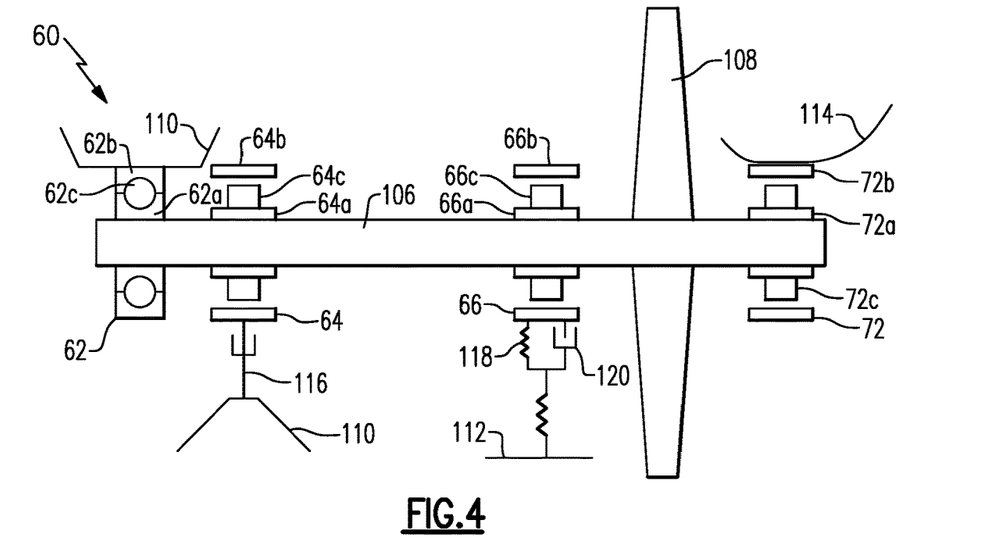
FIG. 4 schematically shows one example of a bearing system layout for the helicopter of FIG. 3.

FIG. 4 shows an example where a power turbine shaft 106 of the power system 94 is mounted on the bearing system 60. The power turbine shaft 106 is coupled to at least one rotating rotor component 108 and provides driving output to drive the main rotor hub 98 and the tail rotor 100 as shown in FIG. 3. Although a particular rotary-wing aircraft configuration is illustrated and described in the disclosed embodiment of FIG. 3, other configurations such as vertical-lift fan, turbo-prop, tilt-rotor, tilt-wing, fixed-wing aircraft, etc. can also utilize the subject bearing system 60.

In the example of FIG. 4, the bearing system 60 includes at least the first bearing 62, the second bearing 64, and the third bearing 66. The first bearing 62 and the second bearing 64 are located between the shaft 106 and a first case or static structure 110. The third bearing 66 is located between a second case or static structure 112 and the shaft 106. The bearing system 60 may also include additional bearings, such as the fourth bearing 72 that is located between the shaft 106 and a third case or static structure 114.

In each example configuration, the first bearing 62 comprises a hard mounted bearing that reacts thrust loads from an associated turbine. A hard mounted bearing is one in which the bearing is directly mounted on the shaft 40, 106 and also transmits load directly to the static support structure. As shown in FIGS. 2 and 4, the first bearing 62 includes an inner race 62a that is directly mounted to the shaft 40, 106 and an outer race 62b that is directly mounted to the inlet case 68 or first case structure 110. In one example, the first bearing 62 comprises a ball bearing that includes balls 62c that are mounted between the inner 62a and outer 62b races.

In each example configuration, the second bearing 64 is mounted on a viscous damper 116. In one example, the viscous damper 116 is an oil-film damper. As shown in FIGS. 2 and 4, the second bearing 64 includes an inner race 64a that is directly mounted to the shaft 40, 106 and an outer race 64b that is mounted to the inlet case 68 or first case structure 110. In one example, the second bearing 64 comprises a roller bearing that includes rollers 64c that are mounted between the inner 64a and outer 64b races. The viscous damper 116 is associated with the outer race 64b and helps to maintain a small radial load on the shaft 40, 106 to "tune" the shaft 40, 106 outside of critical speed limits.

In each example configuration, the third bearing 66 is a resiliently mounted viscous dampened bearing. In one example, the third bearing 66 includes a resilient member 118 in parallel combination with a viscous damper 120, such as an oil damper for example. As shown in FIGS. 2 and 4, the third bearing 66 includes an inner race 66a that is directly mounted to the shaft 40, 106 and an outer race 66b that is mounted to the inner turbine case 70 or second case structure 112. In one example, the third bearing 66 comprises a roller bearing that includes rollers 66c that are mounted between the inner 66a and outer 66b races. The resilient member 118 and viscous damper 120 are associated with the outer race 66b and tunes the shaft 40, 106 to keep it outside of critical speed limits.

In each example configuration, the fourth bearing 72 comprises a hard mounted bearing that reacts most of the radial load from the weight of the associated turbine in addition to unbalance loads from the rotor/shaft. As shown in FIGS. 2 and 4, the fourth bearing 72 includes an inner race 72a that is directly mounted to the shaft 40, 106 and an outer race 72b that is directly mounted to the TEC 74 or third case structure 114. In one example, the fourth bearing 72 comprises a roller bearing that includes rollers 72c that are mounted between the inner 72a and outer 72b races.

Figure 5:
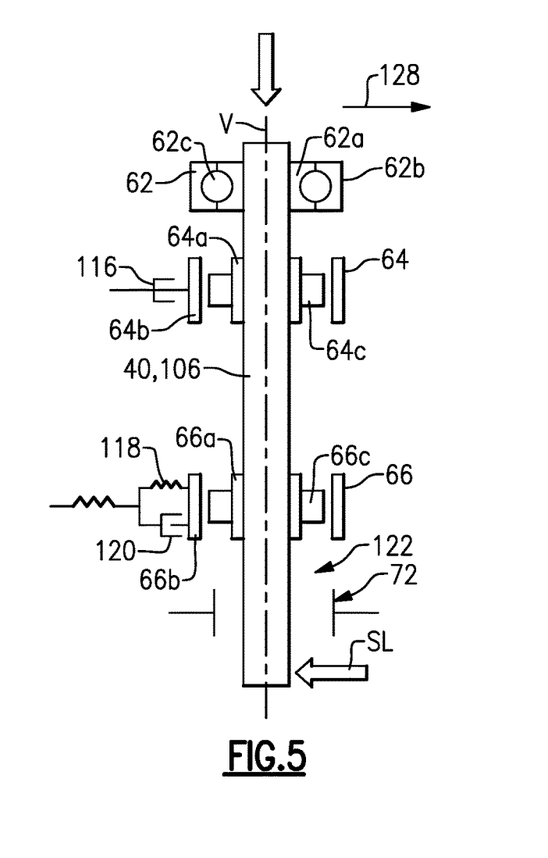
FIG. 5 schematically shows one example of a method of assembly for the disclosed bearing systems.

FIG. 5 schematically shows one example of a method of assembly for the disclosed bearing system 60. The bearings 62, 64, 66, 72 of the bearing system 60 need to be mounted such that they keep the shaft 40, 106 aligned and outside of critical speeds during engine operation. To meet critical speed requirements, the bearings 62, 64, 66, 72 of the disclosed bearing system 60 are mounted in a variety of different mounting arrangements such that the bearings can reduce vibrations. In one example, one or more of the bearings 62, 64, 66, 72 are hard mounted. Hard mounting a bearing may cause the shaft 40, 106 to operate at higher speeds. The subject disclosed bearing system 60 combines one or more hard mounted bearings with bearings that are "soft" mounted such that proper shaft alignment can be maintained. However, the greater the number of bearings that are installed on a shaft, the more difficult it becomes to maintain the desired alignment.

In one disclosed example, the bearing system 60 is assembled in a vertical direction along the shaft 40, 106. A center shaft axis V is orientated to extend in a vertical direction that is traverse to an engine TDC direction 128 and is held in place by a fixture or support structure (not shown). The first bearing 62 is first installed on the shaft 40, 106 in a hard mounting configuration. The inner race 62a is directly mounted to the shaft 40, 106 and the outer race 62b is directly mounted to the inlet case 68 (FIG. 2) or first static structure 110 (FIG. 4). The first bearing 62 is loaded during assembly due to the weight of the shaft 40, 106 and associated rotor and/or rotating elements supported by the shaft 40, 106.

Next, the second bearing 64 is loaded onto the shaft 40, 106. The inner race 64a is directly mounted to the shaft 40, 106 and the outer race 64b is mounted to the inlet case 68 (FIG. 2) or first static structure 110 (FIG. 4) with a viscous damper 116. The second bearing 64 is unloaded during assembly in a floating configuration such that the outer race 64b can move relative to the shaft 40, 106. The second bearing 64 is fully loaded with oil film during engine operation.

Next, the third bearing 66 is mounted on the shaft 40, 106. The inner race 66a is directly mounted to the shaft 40, 106 and the outer races is mounted to the inner-turbine case 70 (FIG. 2) or second static structure 112 (FIG. 4) with a resilient member 118 and viscous damper 120. This configuration also allows the outer race 66b to move or float relative to the shaft 40, 106. In one example, a predetermined side load SL (FIG. 5) is applied against the shaft 40, 106 so that the third bearing 66 is lightly loaded during assembly. In one example, the side load SL is approximately 20 lbs (9 kgs); however, this load can vary dependent upon application and to address different bearing arrangements as needed.

Finally, the fourth bearing 72 is installed on the shaft 40, 106. It is difficult to mount all of the bearings 62, 64, 66, 72 such that they are all aligned and touch at the same time. The second 62 and third 66 bearings have a floating mount configuration such that they can align with the hard mounted first bearing 62. The fourth bearing 72 is also hard mounted on the shaft 40, 106 such that the inner race 72a (FIG. 6) is directly mounted to the shaft 40, 106 and the outer race 72b (FIG. 6) is directly mounted to the TEC 74 (FIG. 2) or third static structure 114 (FIG. 4). When the fourth bearing 72 is to be mounted to the shaft 40, 106, due to the tolerance stack up, there is potential for an offset or eccentricity to exist relative to the TEC 74 or third static structure 114 at the fourth bearing location as indicated at 122.

Figure 6:
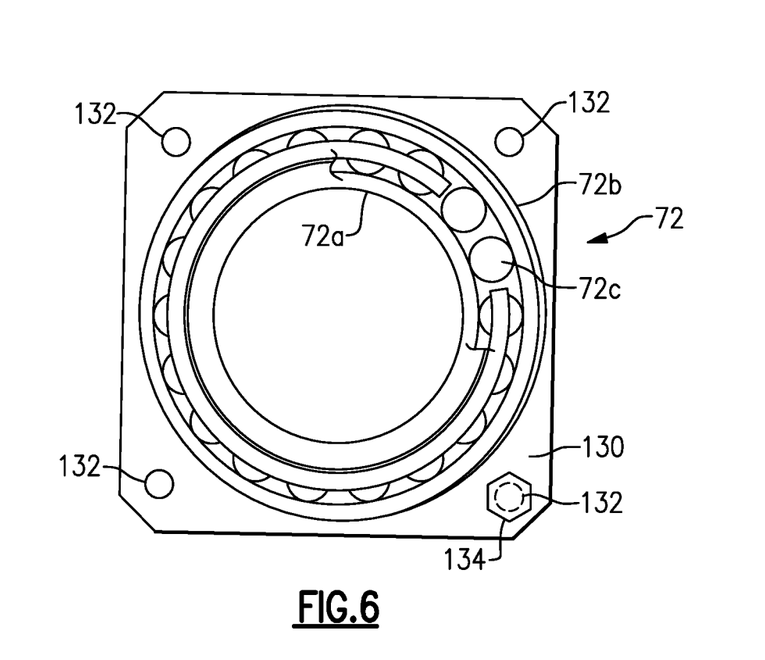
FIG. 6 shows a top view of one example of a bearing from the disclosed bearing systems and which includes an eccentric outer race.

To address this eccentricity, the fourth bearing 72 is provided with an eccentric outer race 72b as shown in FIG. 6. This eccentric outer race 72b ensures proper loading of the other bearings 62, 64, 66 and prevents bowing of the shaft 40, 106 during operation, as well as preventing eccentric turbine rubs. Prior to installing the fourth bearing 72, the eccentricity 122 is measured relative to the TEC 74 or third static structure 114 and an eccentric bearing outer race 72b is selected from a plurality of eccentric bearing outer races 72b having different eccentric offsets. For example, the outer race 72b of the fourth bearing 72 can be made with a variety of eccentric offsets such as 0.002 in (0.005 cm), 0.003 in (0.007 cm), 0.004 in (0.010 cm), etc. If the measured eccentricity 122 (FIG. 5) is 0.004 in for example, then the outer race 72b with the 0.004 in offset is selected for installation to align with the desired shaft location.

Figure 7:
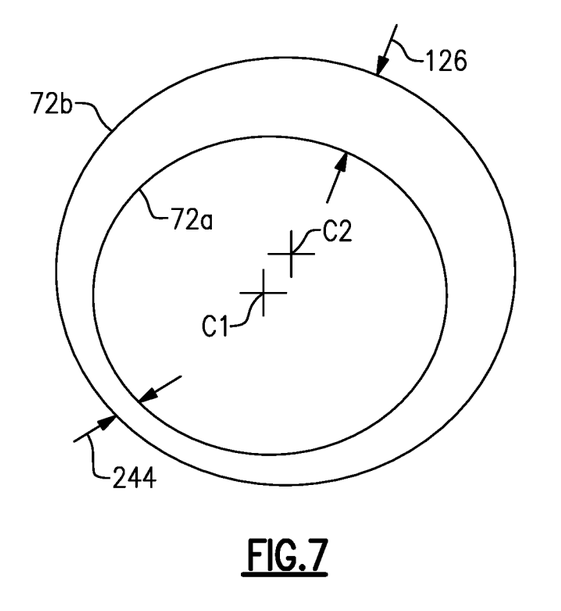
FIG. 7 is a schematic representation of an offset between an inner race and the eccentric outer race of the bearing of FIG. 6.

As shown in FIG. 7 in an exaggerated representation, the inner race 72a of the fourth bearing 72 that rotates with the shaft 40, 106 has a first centerline C1 and the static outer race 72b of the fourth bearing 72 has a second centerline C2 that is radially offset from the first centerline C1. As such there is a narrow zone 124 where the inner 72a and outer 72b races are closer together than at a wide zone 126 where the inner 72a and outer 72b races are farther apart from each other. Once the appropriate outer race 72b has been selected, the outer race 72b is clocked or rotated to the correct circumferential portion such that the wide zone 126 (FIG. 7) is aligned with the wide zone of the eccentricity 122 (FIG. 5). Once the fourth bearing 72 is properly positioned, the fourth bearing 72 is locked in place relative to the TEC 74 or third static structure 114 to keep the fourth bearing 72 aligned with the shaft 40, 106. In one example, the outer race 72b of the fourth bearing 72 includes a flange 130 with one or more fastener openings 132. Fasteners 134 (only one is shown), such as bolts, screws, pins, tangs, etc., can then be inserted through the fastener openings 132 to fix the outer race 72b in place.

The subject disclosure provides a mounting configuration for a bearing system 60 where a power turbine shaft 40, 106 is mounted on multiple bearings 62, 64, 66, 72 which include a combination of hard and soft bearing mounts. In one disclosed configuration the bearing mounting configuration provides for a combination of at least two hard mounted bearings and one or more resiliently mounted bearings. The disclosed mounting configurations enable the shaft 40, 106 to be properly aligned to meet critical speed requirements within the engine packaging limitations thereby reducing weight and lowering overall engine vibration.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An apparatus comprising:
a static engine structure;
at least one shaft that rotates relative to the static engine structure; and
a bearing assembly that supports the shaft, wherein the bearing assembly includes
at least one first bearing hard mounted directly between the shaft and the static engine structure,
at least one second bearing mounted between the shaft and the static engine structure, wherein the at least one second bearing includes a damper, and
at least one third bearing hard mounted directly between the shaft and the static engine structure.

2. The apparatus according to claim 1 wherein the at least one first bearing is a ball bearing, and wherein the at least one second and third bearings are each a roller bearing.

3. The apparatus according to claim 1 wherein the damper of the at least one second bearing comprises a viscous damper.

4. The apparatus according to claim 1 wherein the bearing assembly further includes at least one fourth bearing that is mounted between the shaft and the static engine structure wherein the at least one fourth bearing includes a resilient member, and wherein the at least one second bearing is downstream of the at least one first bearing, the at least one third bearing is downstream of the at least one fourth bearing, and the at least one fourth bearing is downstream of the at least one second bearing.

5. The apparatus according to claim 4 wherein the resilient member of the at least one fourth bearing comprises at least one spring element in combination with a viscous damper.

6. The apparatus according to claim 4 wherein the shaft is coupled to a turbine configured to drive a rotating engine component.

7. The apparatus according to claim 6 wherein the static engine structure includes at least an inlet case portion, an inner turbine case portion, and a turbine exhaust case portion, and wherein the at least one first bearing is mounted directly between the shaft and the inlet case portion, the at least second bearing is mounted between the shaft and the inlet case portion, the at least one fourth bearing is mounted between the shaft and the inner turbine case, and the at least one third bearing is mounted between the shaft and the turbine exhaust case portion.

8. The apparatus according to claim 6 wherein the at least one first bearing comprises a ball bearing and the at least one second, third, and fourth bearings each comprise a roller bearing, and wherein the damper of the at least one second bearing comprises an oil film damper and the resilient member of the at least one fourth bearing comprises at least one spring element in combination with a viscous damper.

9. The apparatus according to claim 4 wherein the at least one third bearing includes an inner race that has a first centerline and an eccentric outer race that has a second centerline that is radially offset from the first centerline.

10. The apparatus according to claim 9 wherein the eccentric outer race is selectively adjustable during assembly to ensure that the at least one third bearing is properly aligned along the shaft with the at least one first, second, and fourth bearings.

11. The apparatus according to claim 10 wherein the eccentric outer race for the third bearing is selected based on an amount of radial offset between the at least one shaft and the static engine structure, and wherein the eccentric outer race is rotated relative to the inner race of the third bearing from an initial position to a final position to provide desired shaft alignment, and including at least one fastener to fix the eccentric outer race to the static engine structure when in the final position.

12. An apparatus comprising:
a static engine structure;
at least one shaft that rotates relative to the static engine structure;
at least one turbine that drives at least one engine component through the at least one shaft; and
a bearing assembly that supports the shaft, wherein the bearing assembly includes
at least one first bearing hard mounted directly between the shaft and the static engine structure,
at least one second bearing hard mounted between the shaft and the static engine structure, wherein the at least one second bearing includes a damper, and
at least one third bearing hard mounted directly between the shaft and the static engine structure.

13. The apparatus according to claim 12 wherein the at least one engine component comprises a helicopter rotor or propeller shaft.

14. The apparatus according to claim 12 wherein the bearing assembly further includes at least one fourth bearing that is soft mounted between the shaft and the static engine structure wherein the at least one fourth bearing includes a resilient member, and wherein the at least one second bearing is downstream of the at least one first bearing, the at least one third bearing is downstream of the at least one fourth bearing, and the at least one fourth bearing is downstream of the at least one second bearing, and wherein the at least one third bearing includes an inner race that has a first centerline and an eccentric outer race that has a second centerline that is radially offset from the first centerline.

15. The apparatus according to claim 14 wherein the damper of the at least one second bearing comprises an oil film damper, and wherein the resilient member of the at least one fourth bearing comprises at least one spring element in combination with a viscous damper.

16. The apparatus according to claim 14 wherein an eccentric outer race for the third bearing is selected based on an amount of radial offset between the at least one shaft and the static engine structure, and wherein the eccentric outer race is rotated relative to the inner race of the third bearing from an initial position to a final position to provide desired shaft alignment, and including at least one fastener to fix the eccentric outer race to the static engine structure when in the final position.

17. A method of assembly comprising:
providing at least one shaft that is configured to rotate relative to a static engine structure about an axis;
mounting a first bearing directly between the shaft and the static engine structure;
mounting a second bearing to the shaft, wherein the at least one second bearing includes a viscous film damper; and
mounting a third bearing directly between the shaft and the static engine structure.

18. The method according to claim 17 including positioning the shaft to extend in a vertical direction during assembly of the first, second, and third bearings.

19. The method according to claim 18 including mounting a fourth bearing to the shaft subsequent to mounting the first and second bearings and prior to mounting the third bearing, wherein the at least one fourth bearing includes a resilient member and viscous damper, and the third bearing including an inner race that has a first centerline and an eccentric outer race that has a second centerline that is radially offset from the first centerline.

20. The method according to claim 19 including measuring an amount of radial offset between the shaft and the static engine structure at a mounting location for the third bearing prior to installing the third bearing and after installing the fourth bearing, selecting an eccentric outer race that is configured address the amount of radial offset, rotating the eccentric outer race that has been selected relative to the inner race to properly align with the shaft, and subsequently fixing the eccentric outer race to the static engine structure.

21. The method according to claim 19 wherein the first bearing is mounted to the shaft prior to the second bearing, the second bearing is mounted to the shaft prior to the third bearing, and the third bearing is mounted to the shaft subsequent to the fourth bearing.

22. The method according to claim 21 including hard mounting the first bearing, soft mounting the second bearing, hard mounting the third bearing, and soft mounting the fourth bearing to maintain a desired shaft alignment.

\* \* \* \* \*

UNITED STATES PATENT AND TRADEMARK OFFICE
CERTIFICATE OF CORRECTION

PATENT NO. : 10,808,753 B1  
APPLICATION NO. : 16/429151  
DATED : October 20, 2020  
INVENTOR(S) : William G. Sheridan and Todd A. Davis It is certified that error appears in the above-identified patent and that said Letters Patent is hereby corrected as shown below:

In the Claims

In Claim 4, Column 8, Line 62; replace "fourth hearing" with --fourth bearing--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*